United States Patent
Moriyama et al.

(10) Patent No.: US 7,511,112 B2
(45) Date of Patent: Mar. 31, 2009

(54) AROMATIC POLYMER, FILM, ELECTROLYTE MEMBRANE AND SEPARATOR

(75) Inventors: Hideki Moriyama, Otsu (JP); Akimitsu Tsukuda, Otsu (JP)

(73) Assignee: Toray Industries, Inc., Tokyo (JP)

( * ) Notice: Subject to any disclaimer, the term of this patent is extended or adjusted under 35 U.S.C. 154(b) by 294 days.

(21) Appl. No.: 10/547,526

(22) PCT Filed: Mar. 2, 2004

(86) PCT No.: PCT/JP2004/002535

§ 371 (c)(1),
(2), (4) Date: Sep. 2, 2005

(87) PCT Pub. No.: WO2004/078827

PCT Pub. Date: Sep. 16, 2004

(65) Prior Publication Data

US 2006/0204812 A1 Sep. 14, 2006

(30) Foreign Application Priority Data

Mar. 5, 2003 (JP) ............................. 2003-058181

(51) Int. Cl.
*C08G 61/02* (2006.01)
*H01M 8/10* (2006.01)

(52) U.S. Cl. ......................... 528/86; 429/33
(58) Field of Classification Search .................. 528/86; 429/33

See application file for complete search history.

(56) References Cited

U.S. PATENT DOCUMENTS

| | | | | |
|---|---|---|---|---|
| 3,130,182 A * | 4/1964 | Frazer | ......................... | 524/173 |
| 3,632,548 A * | 1/1972 | Preston | ........................ | 524/727 |
| 3,642,711 A | 2/1972 | Culbertson | .................... | 260/78 |
| 3,710,945 A * | 1/1973 | Dismore | ................. | 210/321.63 |
| 3,894,990 A * | 7/1975 | Muller et al. | ................ | 524/192 |
| 4,058,503 A * | 11/1977 | Yukuta et al. | ................ | 528/210 |
| 4,075,172 A | 2/1978 | Ozawa et al. | ............ | 260/47 CZ |
| 4,172,959 A * | 10/1979 | Kaiser | ......................... | 568/637 |
| 4,308,311 A * | 12/1981 | Ogawa et al. | ................ | 428/215 |
| 4,349,471 A * | 9/1982 | Blank et al. | .................. | 534/845 |
| 4,847,354 A * | 7/1989 | Keil et al. | ..................... | 528/340 |
| 5,132,387 A * | 7/1992 | Baron et al. | .................. | 528/49 |
| 5,155,203 A * | 10/1992 | Darnell et al. | ............... | 528/125 |

(Continued)

FOREIGN PATENT DOCUMENTS

| | | |
|---|---|---|
| JP | 50-110494 | 8/1975 |
| JP | 51-22798 | 2/1976 |
| JP | 51-123295 | 10/1976 |
| JP | 52-84246 | 7/1977 |
| JP | 52-98795 | 8/1977 |

(Continued)

OTHER PUBLICATIONS

Hergenrother, P.M. et al., High Preformance Polymers, 1994, vol. 117, pp. 67-70.*

*Primary Examiner*—Mark Eashoo
*Assistant Examiner*—Liam J Heincer
(74) *Attorney, Agent, or Firm*—Kubovcik & Kubovcik (57) ABSTRACT

An aromatic polymer containing aromatic polyamide structural units and aromatic carbohydrazide structural units at a specific ratio is disclosed. A film having a high Young's modulus, high elongation at break and low moisture absorption can be formed from such an aromatic polymer. Dehydration cyclization of a compound having a carbohydrazide structure can be conducted under mild conditions at low cost by causing the chemical reaction using a chemical which is selected from the acids and bases.

19 Claims, 1 Drawing Sheet

U.S. PATENT DOCUMENTS

| | | | |
|---|---|---|---|
| 5,290,884 A * | 3/1994 | Calundann et al. | 525/432 |
| 5,329,047 A * | 7/1994 | Naitoh et al. | 564/430 |
| 5,378,538 A * | 1/1995 | Makino et al. | 428/364 |
| 5,514,747 A * | 5/1996 | Hsu et al. | 524/590 |
| 5,972,080 A * | 10/1999 | Nagata | 96/13 |
| 6,197,965 B1 * | 3/2001 | Cook et al. | 546/334 |
| 6,264,857 B1 * | 7/2001 | Kreuer et al. | 252/500 |
| 6,291,129 B1 * | 9/2001 | Shida et al. | 430/270.1 |
| 6,476,184 B1 | 11/2002 | Janietz et al. | 528/422 |
| 6,828,414 B2 * | 12/2004 | Okamoto et al. | 528/425 |
| 2003/0118887 A1 * | 6/2003 | Serpico et al. | 429/33 |
| 2004/0024124 A1 * | 2/2004 | Imaizumi et al. | 525/88 |
| 2004/0138384 A1 * | 7/2004 | Fink et al. | 525/259 |
| 2005/0048341 A1 * | 3/2005 | Kurano et al. | 429/30 |
| 2006/0128690 A1 * | 6/2006 | Ishihara et al. | 514/217.11 |
| 2006/0166067 A1 * | 7/2006 | Kiefer et al. | 429/33 |
| 2006/0183012 A1 * | 8/2006 | Uensal et al. | 429/33 |
| 2007/0100088 A1 * | 5/2007 | Gallucci et al. | 525/446 |

FOREIGN PATENT DOCUMENTS

| | | |
|---|---|---|
| JP | 54-106564 A | 8/1979 |
| JP | 4-194023 A | 7/1992 |
| JP | 2853117 B2 | 11/1998 |
| JP | 2000-273171 A | 10/2000 |
| JP | 2002-524596 A | 8/2002 |
| JP | 2002-367627 A | 12/2002 |

* cited by examiner

Fig. 1

AROMATIC POLYMER, FILM, ELECTROLYTE MEMBRANE AND SEPARATOR

This application is a 371 of international application PCT/JP2004/002535, which claims priority based on Japanese patent application No. 2003-058181 filed Mar. 5, 2003, which is incorporated herein by reference.

TECHNICAL FIELD

The present invention relates to highly heat-resistant, highly rigid aromatic polymers and to films, new chemical reactions of carbohydrazide compounds, electrolyte membranes and fuel cells using the polymers.

BACKGROUND ART

As highly heat-resistant, highly rigid polymers, aromatic polyamides are known. The aromatic polyamides are polymers useful as engineering materials due to their high heat resistance and high mechanical strength. In particular, aromatic polyamides composed of para-directed aromatic groups represented by polyparaphenylene terephthalamide (hereinafter, referred to as PPTA) are of great utility value because they can result in shaped articles superior in strength and elastic modulus as well as the aforementioned properties due to their high stiffness. A para-directed aromatic polyamide typified by PPTA, however, exhibits low solubilities in solvents and dissolves only in extremely restricted solvents such as sulfuric acid. There, therefore, are significant limitations in process. A solution thereof causes no serious problems when fibers are produced therefrom. When it is processed into a shaped article of two or more dimensions such as film, however, it must be processed by a special shaping technique because the solution exhibits an optical anisotropy. Therefore, improvement is required in this respect.

On the other hand, as an approach to improve solubility, introduction of structural units having a bridge such as oxygen or a methylene group is known in U.S. Pat. No. 4,075,172 and Japanese Patent Application Publication No. 52-98795. Generally, however, the introduction of such structural units will affect superior mechanical characteristics, such as Young's modulus and strength, inherent to para-directed aromatic polyamides. As another approach, aromatic polyamides having an aromatic nucleus with a chlorine atom introduced thereto has been proposed in Japanese Patent Application Publication Nos. 52-84246 and 54-106564. The monomers of such aromatic polyamides, however, are expensive and those polymers are not conformable to a current trend that halogen-containing polymers are not preferred.

As a highly heat-resistant, highly rigid polymer other than aromatic polyamides, an aromatic carbohydrazide is disclosed in Japanese Patent No. 2853117, which discloses that a film which can exhibit an extremely high Young's modulus even in one direction is obtained by stretching. This film, however, has a high moisture absorption inherently due to its polymer structure.

Moreover, U.S. Pat. No. 3,642,711 discloses a method for obtaining a highly heat-resistant polymer through thermal dehydration-cyclization of an aromatic carbohydrazide. This method is, however, disadvantageous in industrial aspect because the cyclization reaction needs temperatures as high as 350° C. under reduced pressure. In addition, a thermal cyclization reaction is problematic in that if the reaction time is short, the cyclization reaction will proceed insufficiently, whereas if the reaction time is long, side reactions such as a decomposition reaction will take place.

As an electrolyte membrane, Nafion (registered trademark) of E. I. du Pont de Nemours and Company is used widely. This is problematic in that the cost is very high and the heat-resisting temperature is low because of the use of fluororesin in the polymer. Hydrocarbon-based electrolyte membranes are problematic in that they are of low mechanical strength though they are advantageous is cost. Thus, inexpensive electrolyte membranes having a high heat-resisting temperature and a high mechanical strength are demanded.

DISCLOSURE OF THE INVENTION

The present invention was accomplished through a study for overcoming the problems with the above-mentioned prior art. That is to say, an object of the present invention is to obtain an aromatic polymer which is soluble in an aprotic polar solvent and which exhibits a high Young's modulus, a great elongation at break and a low moisture absorption when being formed into a film. Another object of the present invention is to cause a carbohydrazide structure to undergo dehydration-cyclization under mild conditions at low cost. Still another object of the present invention is to obtain an electrolyte membrane having a high heat-resisting temperature and a high rigidity at low cost.

The present invention is characterized by an aromatic polymer comprising structural units represented by chemical formulas (I), (II) and (III) shown below and satisfying formulas (1) to (3) shown below when molar fractions (%) of the structural units of the chemical formulas (I), (II) and (III) are represented by l, m and n, respectively:

$$80 \leq l+m+n \leq 100 \quad (1)$$

$$5 \leq m \leq 9.0 \quad (2)$$

$$10 \leq n \leq 90 \quad (3)$$

$R^1$: an aromatic group
$R^2$: an aromatic group $R^3$: an aromatic group having 12 or more carbon atoms which has at least one substituent selected from the group consisting of ether (—O—), methylene (—CH$_2$—) and sulfone (—SO$_2$—)
$R^4$: an aromatic group

$R^5$: an aromatic group
$R^6$: an aromatic group.

BEST MODE FOR CARRYING OUT THE INVENTION

The aromatic polymer of the present invention can exhibit solubility in solvent, a high rigidity and a high heat resistance simultaneously by containing aromatic polyamide structures represented by chemical formulas (I) and (II) shown below and an aromatic carbohydrazide structure represented by chemical formula (III) shown below.

(I)

$R^1$: an aromatic group
$R^2$: an aromatic group (II)

$R^3$: an aromatic group having 12 or more carbon atoms which has at least one substituent selected from the group consisting of ether (—O—), methylene (—$CH_2$—) and sulfone (—$SO_2$—)
$R^4$: an aromatic group (III)

$R^5$: an aromatic group
$R^6$: an aromatic group.

As $R^1$ to $R^6$ in the chemical formulas shown above, any aromatic groups may be used. Aromatic groups containing no halogen atoms are preferred as $R^1$ to $R^6$ because they are conformable to a current trend that halogen-containing polymers are not preferred. Moreover, they are preferably structural units represented by chemical formula (V) shown below for attaining one of the objects of the present invention, namely, to obtain an aromatic polymer which is soluble in an aprotic polar solvent and which exhibits a high Young's modulus and a low moisture absorption when being formed into film.

(V)

As X, a hydrogen atom, halogen atoms and organic groups having 1 to 4 carbon atoms but containing no halogen atoms are preferably used. More preferred are a methyl group, an ethyl group, a propyl group, a butyl group and a cyano group. In the molecule, a plurality of kinds of substituents may coexist.

$R^1$ is an aromatic group containing no substituent selected from the group consisting of an ether group (—O—), a methylene group (—CH$_2$—) or a sulfone group (—SO$_2$—). These substituents are necessary for structural units represented by chemical formula (II). These substituents, however, impart flexibility to polymers. The Young's modulus, therefore, may be less than 5 GPa if not only structural units represented by chemical formula (II) but also structural units represented by chemical formula (I) have these flexible substituents. It is more desirable that $R^1$ be a group selected from a phenyl group, a biphenyl group, a terphenyl group, a naphthalene group, an anthracene group, a diaminobenzanilide residue and a 9,9-bis(4-aminophenyl)fluorene residue. It should be noted that part or all of the hydrogen of an aromatic ring may be substituted with another or other atoms or substituents. In addition, aromatic groups containing no halogen atoms are preferred as $R^1$ because they are conformable to a current trend that halogen-containing polymers are not preferred.

As $R^2$, a para-directed phenylene group is preferred, provided that each of the hydrogen atoms at 2-, 3-, 5- and 6-positions of the aromatic ring may be substituted with another atom or substituent.

$R^3$ is an aromatic group having 12 or more carbon atoms which has at least one substituent selected from the group consisting of an ether group (—O—), a methylene group (—CH$_2$—) and a sulfone group (—SO$_2$—). Preferred are aromatic groups including 12 or more but not more than 100 carbon atoms having a structure in which two aromatic groups selected independently from a phenyl group, a biphenyl group, a terphenyl group, a naphthalene group, an anthracene group, a diaminobenzanilide residue and a 9,9-bis(4-aminophenyl)fluorene residue, provided that part or all of the hydrogen thereof may be substituted with other group(s), are combined through at least one substituent selected from the group consisting of an ether group (—O—), a methylene group (—CH$_2$—) and a sulfone group (—SO$_2$—). $R^3$ is more desirably an aromatic group in which phenyl groups are combined through at least one substituent selected from the group consisting of an ether group (—O—), a methylene group (—CH$_2$—) and a sulfone group (—SO$_2$—). It should be noted that part or all of the hydrogen of an aromatic ring may be substituted with another or other atoms or substituents.

As $R^3$, bisphenoxybenzene groups are more desirable and a 1,3-bis(4-phenoxy)benzene group, which is represented by chemical formula (IV), is the most desirable.

As $R^4$, a para-directed phenylene group is preferred, provided that each of the hydrogen atoms at 2-, 3-, 5- and 6-positions of the aromatic ring maybe substituted with another atom or substituent.

As $R^5$, a group selected from a phenyl group, a biphenyl group and a naphthalene group is desirable and a 2,6-naphthalene group is more desirable. It should be noted that each of the hydrogen atoms of the aromatic rings may be substituted with another atom or substituent.

As $R^6$, a para-directed phenylene group is preferred, provided that each of the hydrogen atoms at 2-, 3-, 5- and 6-positions of the aromatic ring may be substituted with another atom or substituent.

The elements or substituents with which hydrogen of the aromatic rings in $R^1$ to $R^6$ are substituted may be, but are not particularly restricted to, halogens, inorganic groups, organic groups, organometallic groups, etc. These substituents contribute to impartation of functions, but they contribute less to heat resistance and mechanical properties because they are substituents on side chains. The following are examples of combinations of a function imparted and a substituent. Substitution with a halogen atom can reduce the moisture absorption of the aromatic polymer. Substitution with an acidic group such as sulfonic acid and phosphonic acid can improve the ionic conductance of the aromatic polymer. Substitution with a bulky group can improve the solubility of the aromatic polymer. Bonding a reactive group or reactive oligomer such as a silyl coupling agent, an epoxy group and a thermally curing polyimide to a side chain can improve the adhesive property of the aromatic polymer. Bonding a fullerene to a side chain can improve the lubricity and electrical characteristics of the aromatic polymer.

Moreover, the aromatic polymer (amide carbohydrazide) of the present invention satisfies formulas (1) to (3) shown below when molar fractions (%) of the structural units of the chemical formulas (I), (II) and (III) are represented by l, m and n, respectively:

$$80 \leq l+m+n \leq 100 \tag{1}$$

$$5 \leq m \leq 90 \tag{2}$$

$$10 \leq n \leq 90 \tag{3}$$

When the molar fraction l+m+m (%) of the highly rigid, highly heat-resistant structural units represented by chemical formulas (I), (II) and (III) is adjusted to $80 \leq l+m+n \leq 100$, the aromatic polymer of the present invention exhibits high rigidity and high heat resistance. The l+m+m is more preferably 90 to 100%, and even more preferably 95 to 100%. If the l+m+n is less than 80%, Young's modulus may become less than 5 GPa.

In the aromatic polymer of the present invention, the molar fraction l (%) of the aromatic polyamide structural unit represented by chemical formula (I) is $0 \leq l \leq 75$, and more preferably $0 \leq l \leq 40$. In addition, it is preferable that $20 \leq l+n \leq 95$. Among the structural units represented by chemical formulas (I), (II) and (III), chemical formulas (I) and (III) are particularly rigid components. When the combined amount of these components is less than 20 mole %, the Young's modulus may become less than 5 GPa, whereas when it exceeds 95 mole %, resulting films may be brittle and easy to be broken. If n is within an appropriate range, 1 may be 0.

In the aromatic polymer of the present invention, the molar fraction m (%) of the aromatic polyamide structural units represented by chemical formula (II) is $5 \leq m \leq 90$. When m is less than 5%, the moisture absorption may become too high. When m is over 90%, the Young's modulus may become less than 5 GPa. The molar fraction m (%) is desirably $10 \leq m \leq 80$, more desirably $20 \leq m \leq 70$.

In the aromatic polymer of the present invention, the molar fraction n (%) of the aromatic dicarbohydrazide structural units represented by chemical formula (III) is $10 \leq n \leq 90$. Because a hydrazide group represented by —NH—NH— contributes to increase in moisture absorption, the moisture absorption of a resulting film may become too high when n is greater than 90%. Because an aromatic dicarbohydrazide which is a source material of the structure represented by chemical formula (III), naphthalene dicarbohydrazide, for example, is almost insoluble in organic solvent, it reacts in the solid state and dissolves only after changing into a polymer. Therefore, if n is greater than 90%, the reaction will proceed very slowly and it may become difficult to obtain polymers with high molecular weights. On the other hand, if n is less than 10%, a resulting film may have a low rigidity. n is desirably $20 \leq n \leq 90$, more desirably $30 \leq n \leq 70$, and most desirably $40 \leq n \leq 60$.

It is also desirable that part or all of the aromatic carbohydrazide structures represented by chemical formula (III) be cyclized by dehydration as shown in chemical formula (VII) to be converted to a polyoxazole structure. In other words, the aromatic polymer of the present invention includes aromatic amide carbohydrazide polymers containing a carbohydrazide structure, aromatic amide oxadiazole polymers containing an oxadiazole structure resulting from dehydration-cyclization of a carbohydrazide structure, and composites of both types of polymers. When part or all of the carbohydrazide structures are changed into polyoxazole structures, the Young's modulus of the aromatic polymer will be improved greatly.

(VII)

$R^5$: an aromatic group
$R^6$: an aromatic group.

As a method for dehydration-cyclizing aromatic carbohydrazide structures to form oxadiazole rings, thermal methods are widely known. The thermal methods, however, need a high temperature of 350° C. under reduced pressure. Through extensive studies, the present inventors found a new chemical reaction to convert a compound having a carbohydrazide structure to a compound having an oxadiazole structure by causing the compound having a carbohydrazide structure to react by means of a chemical agent. This method is favorable due to its industrial advantages because it is possible, according to this method, to produce compounds having an oxadiazole structure at room temperature under normal pressure.

As the chemical agent to be used for the dehydration-cyclization, a chemical agent selected from acids and bases. The acids used herein include acid anhydrides. As the acids, fatty acid anhydrides such as acetic anhydride and aromatic acid anhydrides, for example, are desirably employed. As the bases, organic bases, inorganic bases and the like are desirably employed. Specific examples of the organic bases include aliphatic amines such as triethylamine, aromatic tertiary amines such as dimethylaniline, heterocyclic tertiary amines such as pyridine, picoline and isoquinoline, ammonia and hydrazides. Particularly, nitrogen-containing compounds having 0 to 10 carbon atoms are desirably used due to their superior safety. As the nitrogen-containing compounds having 0 to 10 carbon atoms, aliphatic amines having 1 to 3 carbon atoms such as triethylamine and ethanolamine are particularly desirable, and diethanolamine or triethanolamine is the most desirable. Regarding the chemical agent to be used for the dehydration-cyclization, it is permissive to use a single kind of chemical agent, a combination of a plurality of chemical agents, or a chemical agent or chemical agents diluted in solvent. Because it is possible to carry out dehydration-cyclization at a high efficiency by means of a safe chemical agent such as diethanolamine, and triethanolamine without using dangerous dehydrating agents such as concentrated sulfuric acid with no need for high temperature or reduced pressure, the present invention can provide a production method extremely advantageous in the industrial aspect. No simple and easy method for synthesizing a compound having an oxadiazole ring has heretofore been known. The present invention provides a novel and useful method for producing a compound having an oxadiazole ring.

The "chemical reaction" used herein means the change of a carbohydrazide structure to another structure. The chemical agent to be used for the dehydration-cyclization may be a catalyst, which does not change before and after the reaction. When a base such as amine is used, it probably acts as a catalyst to cause a dehydration-cyclization reaction. When an acid anhydride is used, a dehydration-cyclization reaction is probably caused by the dehydrating action of the acid anhydride. An acid anhydride and a base may be used in the form of a mixture thereof if they are a combination of substances which do not react to each other, such as acetic anhydride and pyridine.

Whether the compound containing a carbohydrazide structure is a high molecular weight compound or a low molecular weight compound; it can be converted to an oxadiazole structure through that reaction. When the compound containing a carbohydrazide structure is an aromatic polymer, a resulting polymer containing an oxadiazole structure is very useful as an aromatic polymer possessing a high heat resistance and a high rigidity. In addition to this, compounds having an oxadiazole structure are useful also as, for example, organic EL material, organic conductive material and organic semiconductor.

The method of dehydration-cyclization using a chemical agent is not particularly restricted. In the case of high molecular weight compounds, examples of the method include a method in which a polymer solution is expanded in plane on a support and then is immersed in a chemical agent and a method in which a chemical agent is mixed with a polymer at a temperature low enough so that a dehydration-cyclization reaction does not proceed and then the mixture is expanded on a support to undergo dehydration-cyclization. When the polymer is expanded in a fibrous form, fibers are formed. The dehydration-cyclization reaction proceeds at normal temperature and normal pressure, but heat treatment may be carried out mainly for drying of the polymer solution or heat setting.

In the case of low molecular weight compounds, dehydration-cyclization by means of a chemical agent can be conducted in various methods; examples include a reaction in solution and a method in which cyclization is carried out simultaneously with vapor deposition by vapor deposition polymerization.

The structure of an aromatic polymer is determined generally by source materials thereof, namely, a diamine and a dicarbohydrazide (hereinafter collectively referred to as "diamine") and a dicarboxylic acid chloride. The same holds true for the case where an aromatic polymer of the present invention is synthesized from isocyanate or carboxylic acid. When the source materials are unknown, structure analysis is carried out for an aromatic polyamide composition. As a method for the analysis, mass spectrometric analysis, analysis by the nuclear magnetic resonance method, spectral analysis, etc. can be used.

In the present invention, examples of the diamine include p-phenylene diamine, 2-nitro-1,4-phenylenediamine, 2-methyl-1,4-phenylenediamine, m-phenylenediamine, 1,5-diaminonaphthalene, 2,6-diaminonaphthalene, 4,4'-diaminodiphenyl ether, 3,4'-diaminodiphenyl ether, 4,4'-diaminodiphenylsulfone, 3,3'-diaminodiphenylsulfone, 2,2'-ditrifluoromethyl-4,4'-diaminobiphenyl, 3,3'-dimethylbenzidine, 4,4'-diaminodiphenylmethane, 4,4'-diaminobenzanilide, 9,9-bis(4-aminophenyl)fluorene, bis[4-(4-aminophenoxy)phenyl]sulfone, bis[4-(3-aminophenoxy)phenyl]sulfone, 2,2-bis[4-(4-aminophenoxy)phenyl]propane, 2,2-bis(4-aminophenyl)hexafluoropropane, 1,3-bis(4-aminophenoxy)benzene, 1,4-bis(4-aminophenoxy)benzene, 4,4'-bis(4-aminophenoxy)biphenyl, 4,4'-diaminodiphenylsulfone, 3,3'-diaminobenzophenone, 3,4'-diaminobenzophenone, 4,4'-diaminobenzophenone, 1,3-bis(3-aminophenoxy)benzene, 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl. 1,3-bis(4-aminophenoxy)benzene is the most desirable.

In the present invention, the dicarbohydrazide includes 2,6-naphthalene dicarbohydrazide, 1,5-naphthalene carbohydrazide, biphenyl dicarbohydrazide, terephthalic acid dicarbohydrazide, isophthalic acid carbohydrazide, etc. 2,6-Naphthalene dicarbohydrazide is preferably used.

In the present invention, the dicarboxylic acid chloride include terephthaloyl dichloride, 2chloro-terephthaloyl dichloride, isophthaloyl dichloride, naphthalenedicarbonyl chloride, biphenyldicarbonyl chloride, terphenyldicarbonyl chloride, etc. Terephthaloyl dichloride or 2chloro-terephthaloyl dichloride is preferably used.

In the present invention, "highly rigid" means having a great tensile modulus of elasticity (Young's modulus). When being used as a magnetic recording medium, the polymer film of the present invention preferably has a Young's modulus in at least one direction of 5 GPa or more because the film will be resistant to the power applied during its processing or application, resulting in good planarity. In addition, when the Young's modulus in at least one direction is 5 GPa or more, it becomes possible to reduce the thickness of the film.

When the Young's modulus in all directions is less than 5 GPa, deformation may occur during processing. Although there is no upper limit with the Young's modulus, if it is greater than 20 GPa, the toughness of the film may be reduced, resulting in difficulty in film production and processing. The Young's modulus is preferably from 5 to 20 GPa, more preferably from 7 to 18 GPa, and even more preferably from 10 to 16 GPa.

The ratio of the maximum value (Em) of Young's modulus to the Young's modulus (Ep) in a direction perpendicular thereto, Em/Ep, is preferably from 1.1 to 3 because the film will exert an improved cutability during its processing. The ratio is more preferably from 1.2 to 2.5, and even more preferably from 1.5 to 2.5. If the Em/Ep is greater than 3, a film may be rather susceptible to rupture.

The film of the present invention preferably has a moisture absorption at 25° C./75 RH % of 7% or less, more preferably 5% or less and even more preferably 2% or less because change in humidity causes less change in characteristics during its application and processing. The moisture absorption referred to herein is measured by a method described below. First, about 0.5 g of film is collected and heated at 120° C. for 3 hours for demoisturing. Then, the temperature was lowered to 25° C. while the film was prevented from moisture absorption. The weight after the temperature lowering is measured accurately to the order of 0.1 mg, where the weight is represented by W0. Subsequently, it is left to stand in an atmosphere at 25° C., 75 RH % for 48 hours. Then, the weight is measured, which is represented by W1. The moisture absorption is calculated by use of the following equation.

Moisture absorption rate (%)=((W1−W0)/W1)×100

The lower the moisture absorption, the better it is. However, a practical lower limit is about 0.03%.

It should be noted that when a film is used as an electrolyte membrane, low moisture absorption is not required. The electrolyte membrane is used rather after being improved in affinity with water by its modification with a polar group or by doping with acid.

The elongation at break in at least one direction of the film of the present invention preferably is 20% or more in the measurement according to JIS-C2318. It is more preferably 20 to 300%, and even more preferably 30 to 250% because less rupture occurs in film production and processing. The upper limit of the elongation at break is not particularly limited, but it practically is about 250%.

The dielectric constant at 1 kHz of the film of the present invention is preferably 4 or less. It is more preferably 3.5 or less, and most preferably 2 or less. When the dielectric constant is small, it is possible to reduce the delay of signals when using the film of the present invention as an electronic circuit substrate.

The measurement of the dielectric constant can be carried out by use of an automatic balance bridge at measurement frequencies: 1 k, 1 M and 10 MHz (three levels) at a measurement temperature: room temperature (21° C.). A specimen is applied with a three-terminal electrode to form a specimen under test. Some examples of the measurement conditions are as follows:

Apparatus: Impedance/Gain-Phase Analyzer 4194A manufactured by HEWLETT PACKARD

Jig: 16451B DIELECTRIC TEST FIXTURE

Electrode: Electrically conductive silver paste coating "DOTITE"manufactured by Fujikura Kasei Co., Ltd.

Dimensions: Outer diameter of surface electrode inner circle: 37 mm Inside diameter of surface electrode outer circle: 39 mm Outer diameter of rear side (counter) electrode: 50 mm The number of measurements: n=5

Atmosphere in test chamber: 21±2° C., 60±5% RH

Calculation formula: A dielectric constant $\epsilon$ and a dielectric loss tangent $\tan\delta$ are calculated using the following equation:

$$\epsilon = (Cx \times t)/(\epsilon 0 \times A)$$

$$\tan\delta = Gx/2\pi f \cdot Cx$$

wherein Cx: electrostatic capacitance (F) of the object
t: thickness of the specimen (m)
A: effective area of the electrode ($m^2$)
c: velocity of light
$\epsilon_0$: electric constant $8.854 \times 10^{-12}$ (F/m)=$(4\pi)^{-1} \times c^{-2} \times 10^7$ (m·$sec^{-1}$)
Gx: conductance (S) of the object
f: measurement frequency ($\omega = 2\pi f$) (Hz)

It is desirable for the film of the present invention to exhibit a thermal shrinkage in at least one direction of 1% or less when being heat treated at 200° C. for 30 minutes under substantially no tension because the dimensional change during processing and change is phase contrast characteristic can be controlled. The thermal shrinkage is more preferably 0.5% or less, and even more preferably 0.3% or less. The thermal shrinkage is defined by the following equation.

Thermal shrinkage (%)=((Specimen length before heat treatment−Specimen length after heat treatment and cooling/(Specimen length before heat treatment))×100

The lower the heat shrinkage, the better it is. However, a practical lower limit is about 0.1%. When the heat shrinkage in at least one direction measured under the aforementioned conditions is 1% or less, it becomes possible to form an electric circuit or to solder an electronic part on the polymer film of the present invention. In addition, the film is strain-resistant when it is attached to another object and, therefore, less warp will occur.

The film of the present invention preferably has a coefficient of thermal expansion from 80° C. to 120° C. of 50-0 ppm/° C. The coefficient of thermal expansion is measured in a temperature lowering step following temperature elevation to 150° C. When the initial length of a specimen at 25° C., 75 Rh % is represented by L0, the length of the specimen at a temperature T1 is represented by L1 and the length of the specimen at a temperature T2 is represented by L2, the coefficient of thermal expansion from T1 to T2 is determined using the following equation:

Coefficient of thermal expansion (ppm/° C.)=((L2−L1)/L0)/(T2/T1)×$10^6$

The coefficient of thermal expansion is more preferably 30-0 ppm/° C., and even more preferably 20-0 ppm/° C.

Moreover, the film of the present invention preferably has a coefficient of moisture expansion from 30% Rh to 80% Rh at 25° C. of 50-0 ppm/% Rh. In the determination of the coefficient of moisture expansion, a film which will become a sample is first fixed in a high-temperature high-humidity bath so as to have a width of 1 cm and a sample length of 15 cm. Moisture is removed to a certain humidity (about 30% Rh). After the film length becomes constant, moisture is added (to about 80% Rh) and the sample thereby begins to lengthen. About 24 hours later, the moisture uptake reaches equilibrium and the elongation of the film also reaches equilibrium. Based on the amount of the elongation, the coefficient is calculated using the following equation.

Coefficient of moisture expansion ((cm/cm)/% Rh)=Amount of elongation/(Sample length×Humidity difference)

The coefficient of moisture expansion is more preferably 30-0 ppm/% Rh, and even more preferably 20-0 ppm/% Rh. When the coefficient of thermal expansion and the coefficient of moisture expansion are small, the dimensional change caused by the environment become small and less errors will occur when the film is fabricated into a magnetic recording material.

Examples of the method for producing the aromatic polymer of the present invention and the method for producing a film by processing the aromatic polymer are described below, but the present invention is not limited thereto.

As the method for obtaining an aromatic polymer, various methods used for aromatic polyamides maybe used. For example, low temperature solution polymerization, interfacial polymerization, melt polymerization, solid phase polymerization, vapor deposition polymerization, and the like may be used. In the low temperature solution polymerization, that is to say, when an aromatic polymer is obtained from an acid dichloride and a diamine, it is desirable to conduct the polymerization in an aprotic organic polar solvent. In a polymer solution, when an acid dichloride and a diamine are used as monomers, hydrogen chloride is formed as a byproduct. In the case of neutralizing this, an inorganic neutralizer such as calcium hydroxide, calcium carbonate and lithium carbonate or an organic neutralizer such as ethylene oxide, propylene oxide, ammonia, triethylamine, triethanolamine and diethanolamine is used. The reaction between an isocyanate and a carboxylic acid is carried out in the presence of a catalyst in an aprotic organic polar solvent.

When the polymerization is carried out using two or more kinds of diamines, available are a stepwise reaction method comprising adding diamines one after another, adding an acid dichloride in an amount of 10 to 99 mole % with respect to the diamines to react them, subsequently adding other diamines and further adding an acid dichloride to react them, and a method comprising adding all diamines after mixing them together, followed by adding acid dichloride to react them. Also in the case of utilizing two or more kinds of acid chlorides, a stepwise method, a method of simultaneously adding, etc. may be used. In both cases, the molar ratio of the whole diamines and the whole acid dichloride is preferably within the range of 95:105 to 105:95. If the ratio is out of this range, it may be difficult to obtain a polymer solution suitable for shaping.

The "dissolution" referred to in the present invention means that a state where a polymer maintaining its fluidity without forming suspension or gel is dispersed in a solvent persists for 24 hours or more. In the polymer dissolution step, heat stirring may be conducted at temperatures equal to or lower than 100° C.

The polymer solution may be used as received as a stock solution for the preparation of shaped articles. Alternatively, it is also permissive to isolate a polymer once and then redissolve it in the aforementioned organic solvent or in an inorganic solvent such as sulfuric acid to prepare a stock solution.

The intrinsic viscosity of the polymer (the value of 100 ml of a solution with 0.5 g of the polymer dissolved in sulfuric acid, measured at 30° C.) is preferably 0.5 or more.

To the polymer stock solution for obtaining shaped articles, an inorganic salt, e.g. calcium chloride, magnesium chloride, lithium chloride, lithium nitrate and lithium bromide, may be added as a dissolution aid. Halogen salts of Group 1(alkali metals) or Group 2 (alkaline earth metals) are preferred as the inorganic salt. Lithium halides such as lithium bromide and lithium chloride are more preferable. Although the aromatic polymer of the present invention is soluble in organic solvent, dicarbohydrazide which is a source material of the polymer is almost insoluble in organic solvent and a resulting polymer also exerts a low solubility. It, therefore, is desirable to add a dissolution aid. The amount of the dissolution aid added is preferably from 1 to 50% by weight with respect to the polymer. If it is 1% or less, the effect of the dissolution aid may hardly be shown. On the other hand, if the amount is more than 50%, some problems may arise, e.g. corrosion of a film-forming support during production of films.

The polymer concentration in a stock solution is preferably from 2 to 40% by weight, more preferably from 5 to 35% by weight, and particularly preferably from 10 to 25% by weight. If the polymer concentration is less than 2% by weight, a large amount of discharge is needed, resulting in economical disadvantages. If it exceeds 40% by weight, it may become difficult to obtain thin fibrous articles or thin film-like articles due to the discharge amount or the solution viscosity.

Oligomers (low molecular weight substances) in the polymer solution may deteriorate mechanical characteristics or thermal characteristics of resulting shaped articles or qualities of products during their application. Therefore, the amount of oligomers with molecular weights of 1,000 or less is preferably 1% by weight or less of the polymer. The amount of oligomers is more preferably 0.5% by weight or less. The weight fraction of oligomers can be calculated by incorporating a low angle laser light scattering spectrometer (LALLS) and a differential refractometer (RI) into a gel permeation chromatograph (GPC), measuring a light scattering intensity and a refractive index difference of molecular chain solutions which have been size-fractionated by means of a GPC device with elution time, thereby calculating the molecular weights of solutes and their contents one after another, and finally determining the absolute molecular weight distribution of high molecular weight substances. Diphenylmethane is used for calibration of absolute molecular weights.

In the production of the aromatic polymer of the present invention, examples of the aprotic polar solvent to be used include sulfoxide solvents such as dimethylsulfoxide and diethylsulfoxide, formamide solvents such as N,N-dimethylformamide and N,N-diethylformamide, acetamide solvents such as N,N-dimethylacetamide and N,N-diethylacetamide, pyrrolidone solvents such as N-methyl-2-pyrrolidone and N-vinyl-2-pyrrolidone, phenolic solvents such as phenol, o-, m- or p-creosol, xylenol, halogenated phenols and catechol, or hexamethylphosphoramide and γ-butyrolactone. These can be used solely or in the form of a mixture. Moreover, aromatic hydrocarbons such as xylene and toluene may also be used. Furthermore, for the purpose of facilitating the dissolution of a polymer, it is also permissive to add, to the polymer, a salt of alkali metal or alkaline earth metal in an amount of 50% by weight or less with respect to the polymer.

It is permissive to allow the aromatic polymer of the present invention to contain 10% by weight or less of inorganic or organic additives for the purpose of surface formation or processability improvement. Examples of additives for surface formation include inorganic particles such as $SiO_2$, $TiO_2$, $Al_2O_3$, $CaSO_4$, $BaSO_4$, $CaCO_3$, carbon black, carbon nanotube, fullerene, zeolite and other metal fine powders. Preferable organic particles include, for example, particles composed of organic macromolecules such as crosslinked polyvinylbenzene, crosslinked acrylics, crosslinked polystyrene, polyester particles, polyimide particles, polyamide particles and fluororesin particles, or inorganic particles applied with treatment to their surfaces such as coating with the aforementioned organic macromolecules.

Next, the production of films is described. Because the aromatic polymer of the present invention is soluble in organic solvent, it does not necessarily need a special film forming method using concentrated sulfuric acid as PPTA does. The film-forming stock solution prepared as described above is subjected to the so-called solution casting process similarly to aromatic polyamide so as to form a film. The solution casting process includes a dry-wet process, a dry process and a wet process. Although films may be produced by any of those processes, the dry-wet process will now be described as an example.

When the film is prepared by a dry-wet process, the film-forming solution is extruded through a die onto a support such as a drum or an endless belt to form a thin film. The thin film layer is then dried by evaporation of the solvent until the thin film acquires self-supporting property. The drying may be carried out at room temperature to 220° C. for not more than 60 minutes. When the drum or endless belt used in the drying step is as smooth as possible, it is possible to obtain a film with a smooth surface. The film after the above-mentioned dry process is peeled off from the support and subjected to a wet process in which desalting and desolventing are conducted. In addition, it is stretched, dried and heat treated to yield a film.

Regarding the stretching, the stretching ratio in area stretching ratio is preferably within the range of from 0.8 to 8, more preferably from 1.3 to 8. The area stretching ratio is defined as a value obtained by dividing the area of the film after stretching by the area of the film before stretching. The area stretching ratio not more than 1 means being relaxed. Regarding the heat treatment, it is conducted at a temperature of 200° C. to 500° C., preferably 250° C. to 400° C. for several seconds or several minutes. It is effective to slowly cool the film after the stretching or the heat treatment. It is effective to cool the film at a rate of not more than 50° C./second.

After being shaped into film, the aromatic polymer film of the present invention may also be stretched again under conditions of 300° C. or higher. The high temperature stretching step of the film of the present invention is preferably conducted within a temperature range of 300 to 600° C., more preferably 350 to 550° C. The high temperature stretching may be conducted in a medium inert to the polymer, e.g. in the air, in nitrogen, in argon, in carbon dioxide gas and in helium. Because the polymer film inherently has a high glass transition temperature (250° C. or higher), the film may chaps at low temperature stretching and, therefore, may rupture at a low stretching ratio.

Next, dehydration-cyclization is described. Using the stock solution obtained in the above-mentioned method, namely, the solution of an aromatic amide carbohydrazide in organic solvent, the operations shown below as examples are carried out. (1) To extrude the solution through a die onto a support such as a drum or an endless belt to form a thin film and then immerse the film in a dehydration-cyclization agent solution bath. (2) To add a dehydration-cyclization agent solution to a stock solution just before a die and then extrude the resulting solution through the die onto a support such as a drum or a endless belt and cool it to form a thin film. Or, (3) To extrude a stock solution through a die onto a support such as a drum or an endless belt to form a thin film, and then dry it by evaporation of the solvent from the thin film layer until the thin film acquires self-supporting property. The self-supporting film is peeled off from the support and then immersed in a dehydration-cyclization agent solution bath. Although the above-mentioned methods are shown as examples, the method of cyclizing by dehydration is not restricted thereto. The film cyclized by dehydration is further stretched, dried and heat treated to yield a film. Heat treatment conditions are at a temperature of 200° C. to 500° C., preferably 250° C. to 400° C. for several seconds or several minutes.

The film of the present invention maybe either a monolayer film or a multilayer film. The film of the present invention is used suitably for various applications such as flexible printed circuit substrates, semiconductor-mounting substrates, multilayer circuit substrates, capacitors, printer ribbons, sound diaphragms, base films of solar batteries and electrolyte membranes. The film of the present invention is particularly preferably used as a magnetic recording medium in which a magnetic layer has been formed on at least one side because effects of the film of the present invention having both a high power and a high durability are fully exerted.

The film of the present invention can be used as an acid-base type hydrocarbon polymer electrolyte membrane when being doped with acid such as sulfuric acid and phosphoric acid to form an aromatic polymer/acid composite. In addition, the film of the present invention can be used as an electrolyte membrane when the aromatic polymer is modified with a polar group. Here, examples of the polar group include a sulfonic acid group, a sulfuric acid group, a phosphonic acid group, a phosphoric acid group and a carboxylic acid group. The method for the modification include a method of modifying by immersing the aromatic polymer film of the present invention in a solution of concentrated sulfuric acid, chlorosulfuric acid, fuming sulfuric acid, sulfonic acid and phosphonic acid (method 1) and a method using a raw material having a substituent as a raw material when polymerizing the aromatic polymer of the present invention (method 2).

Next, the method for producing the polymer electrolyte membrane of the present invention is described in more detail on the basis of the above-mentioned method 1.

In the polymer electrolyte film of the present invention, it is important that a polar group exists at least in a void in the membrane. The polar group maybe selected appropriately depending on the ion to conduct and may be either an anionic group or a cationic group. For example, in the case of using the membrane as a proton conducting membrane of a fuel cell or the like, preferred is an anionic group, such as a sulfonic acid group, a sulfuric acid group, a phosphonic acid group, a phosphoric acid group and a carboxylic acid group.

Explanation is made by taking, as an example, a case of introducing an anionic group by a polymer reaction. Introduction of a phosphonic acid group to an aromatic polymer can be achieved by, for example, a method disclosed in Polymer Preprints, Japan, 51, 750 (2002). Introduction of a phosphoric acid group to an aromatic polymer can be achieved by, for example, phosphate esterification of an aromatic polymer having a hydroxyl group. Introduction of a carboxylic acid group to an aromatic polymer can be achieved by, for example, oxidizing an aromatic polymer having an alkyl group, a hydroxyalkyl group, or the like. Introduction of a sulfuric acid group to an aromatic polymer can be achieved by, for example, sulfate esterification of an aromatic polymer having a hydroxyl group. As a method for sulfonating an aromatic polymer, namely a method for introducing a sulfonic acid group, methods disclosed in Japanese Patent Application Publication No. 2-16126 or Japanese Patent Application Publication No. 2-208322 are known, for example. Concretely, for example, sulfonation can be achieved by allowing an aromatic polymer to react with a sulfonation agent such as chlorosulfonic acid in solvent or by allowing them to react in concentrated sulfuric acid or fuming sulfuric acid. Available as the solvent is a solvent which does not react with a polar group-introducing agent or which does not react very violently and can permeate the polymer. Examples of such a solvent include halogenated hydrocarbons such as chloroform, 1,2-dichloroethane, dichloromethane and perchloroethylene, nitrated hydrocarbons such as nitromethane and nitroethane, and nitriles such as acetonitrile. The solvent and the polar group-introducing agent each may be either a single substance or a mixture of two or more kinds.

The sulfonating agent is not particularly restricted if it is one which can sulfonate an aromatic polymer. Besides those mentioned above, sulfur trioxide and the like can be employed. When sulfonating an aromatic polymer by this method, it is possible to control the degree of sulfonation easily by the amount of the sulfonating agent used, the reaction temperature and the reaction time. Introduction of a sulfonimide group to an aromatic polymer can be achieved by, for example, a method of allowing a sulfonic acid group and a sulfonamide group to react.

When using as an electrolyte membrane, it is believed that a $H^+$ ion, namely, a proton moves together with a water molecule. It is desirable that the membrane have a moisture absorption of several percent to several tens percent.

For manufacturing a high-power polymer electrolyte type fuel cell with a high energy capacity, it is desirable that the ion conductance and the fuel permeation amount be within the ranges described below.

With a polymer electrolyte membrane processed into a film having a thickness ranging from 10 µm to 500 µm, the ionic conductance in water is preferably 10 mS/cm or more. When less than 10 mS/cm, it is hard to obtain a high power as a battery. The ionic conductance is preferably 40 mS/cm or more, and more preferably 60 mS/cm or more. Although no upper limit is particularly set, the greater the ionic conductance, the better it is unless the film dissolves or disintegrates by the action of the fuel. The ionic conductance referred to herein can be determined by immersing a sample in pure water at 25° C. for 24 hours, followed by removing it to an atmosphere at 25° C. and a relative humidity of 50 to 80% and measuring a resistance by the controlled-potential AC impedance method.

The electrolyte membrane of the present invention is widely used for applications such as fuel cells, production of table salt, production of drinking water or industrial water, desalting purification of chemical agents, treatment of dairy products, production of low-salt soy sauce, recovery or purification of metal or free acid, production of hydrogen and oxygen by electrolysis of water, and production of acid or alkali by electrolysis of salt. The electrolyte membrane of the present invention is particularly useful as an electrolyte membrane for fuel cell. More particularly, it can be utilized suitably for solid polymer type fuel cells, direct methanol type solid polymer fuel cells and phosphoric acid type fuel cells.

The film of the present invention is also applicable as a partition of electrolytic solution, namely, a separator due to its high heat resistance and mechanical strength. In this case, it is desirable to use the film of the present invention after rendering it porous.

Figure 1:
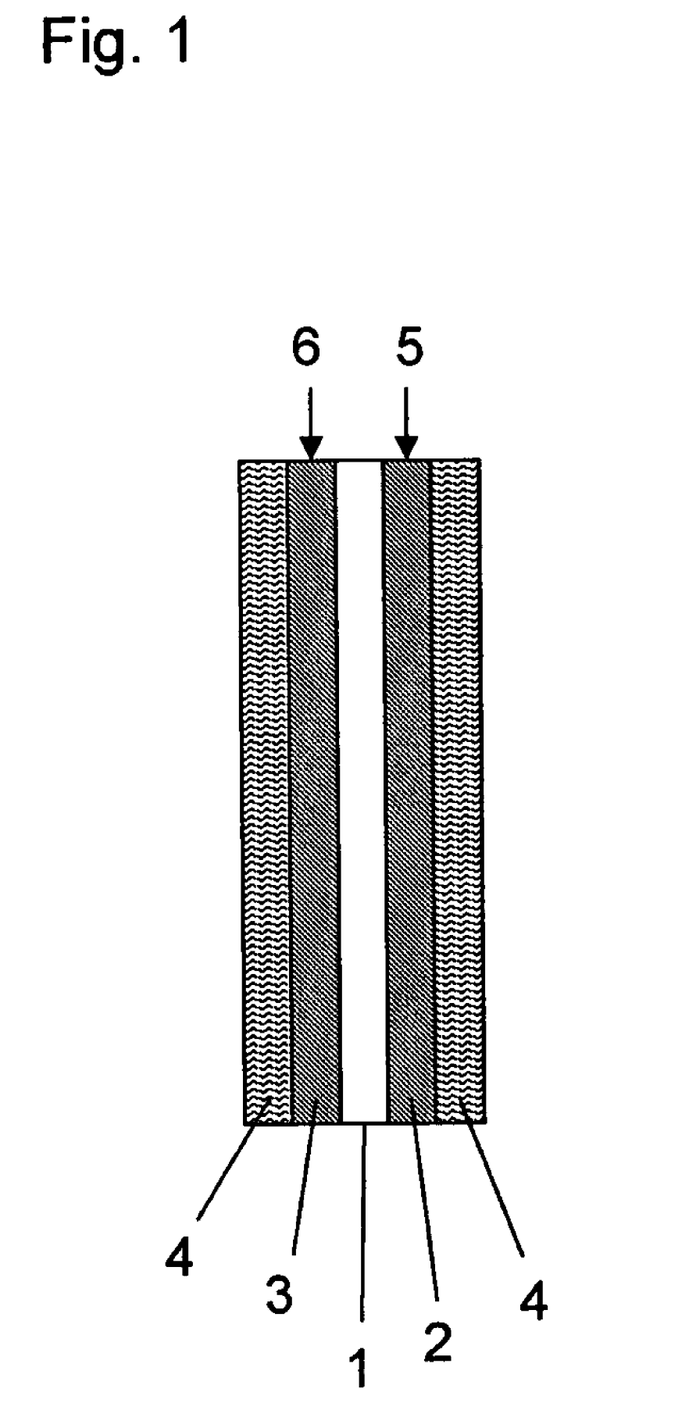
FIG. 1 is a schematic diagram showing the structure of a fuel cell.

A schematic diagram of a solid polymer type fuel cell is shown in FIG. 1. On a surface of an electrolyte membrane 1, a catalyst using platinum or the like (not shown) has been applied. On both sides of the electrolyte membrane 1, two electrodes, a fuel electrode 2 and an air electrode 3, are disposed. As materials of the electrodes, carbon material or the like is suitably used. Separators 4 are disposed outside the electrodes. Although not shown in the diagram, a gas passage is formed between each electrode and each separator. When fuel gas 5 such as hydrogen is supplied to the passage of the side of the fuel electrode 2 and gas 6 containing oxygen, such as air, is supplied to the passage of the side of the air electrode 3, an electrochemical reaction takes place on the catalyst and, as a result, an electric current is produced.

There is not particular limitations with applications of the fuel cell, it can be used suitably for electronic devices, electric devices, home power source, commercial power generation, aerospace applications and transportation.

The present invention will be explained in more detail with reference to the following Examples.

The methods for measuring physical properties and evaluating effects in the present invention are described below.

(1) Young's Modulus, Strength and Elongation at Break

A film was sampled and was measured at a specimen width of 10 mm, a specimen length of 50 mm, a tensile speed of 300 mm/min, 23° C. and 65% RH using a Robot Tensilon RTA-100 (manufactured by ORIENTEC Co., Ltd.). In the specimen, the direction of film formation (MD) was defined as the width direction and a direction perpendicular thereto was defined as the length direction.

(2) Moisture Absorption Rate

About 0.5 g of film was taken and heated at 120° C. for 3 hours for demoisturing. Then, the temperature was lowered to 25° C. while the film was prevented from moisture absorption. The weight after the temperature lowering was measured accurately to the order of 0.1 mg, where the weight was represented by $W_0$. Subsequently, it was left to stand in an atmosphere at 25° C., 75 RH % for 48 hours. Then, the weight was measured, which was represented by $W_1$. The moisture absorption was calculated by use of the following equation.

Moisture absorption rate (%)=(($W_1$−$W_0$)/$W_0$)×100

(3) Solubility of Polymer

A polymer whose solution after the completion of polymerization was impossible to be processed into film due to gelation was judged as x. A polymer, whose solution after the completion of polymerization was possible to be processed into film in spite of gelation or loss of transparency was judged as Δ. A polymer whose solution after the completion of polymerization and after being left to stand at 23° C. for 24 hours was transparent and was possible to be processed into film was judged as o.

(4) Method for Determining Conductivity

Regarding the ionic conductance, a sample was immersed in pure water at 25° C. for 24 hours, then removed to an atmosphere at 25° C. and a relative humidity of 50 to 80%, and measured for a resistance by the controlled-potential AC impedance method described below.

Using an electrochemical analysis system (Solartron 1287 Electrochemical Interface and Solartron 1255B Frequency Response Analyzer) manufactured by Solartron, a sample was sandwiched between two round electrodes (made of stainless steel), one having a diameter of 2 mm and the other having a diameter of 10 mm, under a load of 1 kg (effective electrode area: 0.0314 $cm^2$). To the interfaces between the sample and the electrodes, a 15% aqueous solution of poly (2-acrylamide-2-methylpropanesulfonic acid) was applied. The ionic conductance in the film thickness direction was determined through measurement of the controlled-potential impedance at 25° C. (AC amplitude: 50 mV).

(5) Glass Transition Temperature (Tg):Dynamic Viscoelasticity Measurement

Apparatus: DMS6100 viscoelasticity spectrometer (manufactured by Seiko Instruments Inc.)

According to ASTM E1640-94, an inflection point of E' was designated as Tg. Because of the limit with the apparatus, it was impossible to determine glass transition temperatures higher than 360° C., which were, therefore, recorded as "360° C. or higher".

EXAMPLE 1

A 200-ml, four-necked flask equipped with a stirrer was charged with 3.6638 g of 2,6-naphthalene dicarbohydrazide, 4.3850 g of 1,3-bis-(4-aminophenoxy)benzene, 149.67 ml of N-methyl-2-pyrrolidone and 5.98 g of lithium bromide, followed by stirring under nitrogen under ice cooling. During a period from 10 to 30 minutes later, 6.091 g of terephthaloyl dichloride was added in five portions. After stirring for additional one hour, hydrogen chloride produced during the reaction was neutralized with 2.139 g of lithium carbonate to yield a transparent polymer solution. Even after being left to stand for two weeks, the polymer solution was transparent and maintained its fluidity.

A portion of the resulting polymer solution was taken on a glass plate and then a uniform film was formed therefrom with a bar coater. The film was heated at 120° C. for seven minutes to yield a self-supporting film. The resulting film was removed from the glass plate and was fixed in a metal frame. It was washed with running water for 10 minutes and then subjected to heat treatment at 280° C. for one minute to yield an aromatic polymer film. The Young's modulus and moisture absorption of the resulting film were measured, which are shown in Table 1. The glass transition temperature detected in the dynamic viscoelasticity measurement was 360° C. or higher.

EXAMPLE 2

A 200-ml, four-necked flask equipped with a stirrer was charged with 1.4655 g of 2,6-naphthalene dicarbohydrazide, 4.0926 g of 1,3-bis-(4-aminophenoxy)benzene, 68.31 ml of N-methyl-2-pyrrolidone and 4.08 g of lithium bromide, followed by stirring under nitrogen under ice cooling. During a period from 10 to 30 minutes later, 4.0604 g of terephthaloyl dichloride was added in five portions. After stirring for additional one hour, hydrogen chloride produced during the reaction was neutralized with 1.426 g of lithium carbonate to yield a transparent polymer solution. Even after being left to stand for two weeks, the polymer solution was transparent and maintained its fluidity.

A portion of the resulting polymer solution was taken on a glass plate and then a uniform film was formed therefrom with a bar coater. The film was heated at 120° C. for seven minutes to yield a self-supporting film. The resulting film was removed from the glass plate and was fixed in a metal frame. It was washed with running water for 10 minutes and then subjected to heat treatment at 280° C. for one minute to yield an aromatic polymer film. The Young's modulus and moisture absorption of the resulting film were measured, which are shown in Table 1.

EXAMPLE 3

A 200-ml, four-necked flask equipped with a stirrer was charged with 2.931 g of 2,6-naphthalene dicarbohydrazide, 1.2977 g of paraphenylenediamine, 1.2014 g of 4,4'-diaminodiphenyl ether, 115.89 ml of N-methyl-2-pyrrolidone and 4.67 g of lithium bromide, followed by stirring under nitrogen under ice cooling. During a period from 10 to 30 minutes later, 6.0906 g of terephthaloyl dichloride was added in five portions. After stirring for additional one hour, hydrogen chloride produced during the reaction was neutralized with 2.1391 g of lithium carbonate to yield a transparent polymer solution. Even after being left to stand for two weeks, the polymer solution was transparent and maintained its fluidity.

A portion of the resulting polymer solution was taken on a glass plate and then a uniform film was formed therefrom with a bar coater. The film was heated at 120° C. for seven minutes to yield a self-supporting film. The resulting film was removed from the glass plate and was fixed in a metal frame. It was washed with running water for 10 minutes and then subjected to heat treatment at 280° C. for one minute to yield an aromatic polymer film. The Young's modulus and moisture absorption of the resulting film were measured, which are shown in Table 1.

EXAMPLE 4

A 200-ml, four-necked flask equipped with a stirrer was charged with 2.4425 g of 2,6-naphthalene dicarbohydrazide, 4.3250 g of bis[4-(4-aminophenoxy)phenyl]sulfone, 78.88 ml of N-methyl-2-pyrrolidone and 4.68 g of lithium bromide, followed by stirring under nitrogen under ice cooling. During a period from 10 to 30 minutes later, 4.0604 g of terephthaloyl dichloride was added in five portions. After stirring for additional one hour, hydrogen chloride produced during the reaction was neutralized with 1.426 g of lithium carbonate to yield a transparent polymer solution. Even after being left to stand for two weeks, the polymer solution was transparent and maintained its fluidity.

A portion of the resulting polymer solution was taken on a glass plate and then a uniform film was formed therefrom with a bar coater. The film was heated at 120° C. for seven minutes to yield a self-supporting film. The resulting film was removed from the glass plate and was fixed in a metal frame. It was washed with running water for 10 minutes and then subjected to heat treatment at 280° C. for one minute to yield an aromatic polymer film. The Young's modulus and moisture absorption of the resulting film were measured, which are shown in Table 1.

EXAMPLE 5

A portion of the polymer solution of Example 4 was taken on a glass plate and then a uniform film was formed therefrom with a bar coater. This is immersed in a bath composed of 50% by weight of diethanolamine and 50% by weight of NMP for five minutes to yield a self-supporting film. The resulting film was washed with running water for 10 minutes and then subjected to heat treatment at 280° C. for one minute to yield an aromatic polymer film. The Young's modulus of the resulting film was measured, which is shown in Table 1.

EXAMPLE 6

A 200-ml, four-necked flask equipped with a stirrer was charged with 8.5488 g of 2,6-naphthalene dicarbohydrazide, 3.0036 g of 4,4'-diaminodiphenyl ether, 150.30 ml of N-methyl-2-pyrrolidone and 9.03 g of lithium bromide, followed by stirring under nitrogen under ice cooling. During a period from 10 to 30 minutes later, 10.1510 g of terephthaloyl dichloride was added in five portions. After stirring for additional one hour, hydrogen chloride produced during the reaction was neutralized with 3.5652 g of lithium carbonate to yield a transparent polymer solution. Even after being left to stand for two weeks, the polymer solution was transparent and maintained its fluidity.

A portion of the resulting polymer solution was taken on a glass plate and then a uniform film was formed therefrom with a bar coater. The film was heated at 120° C. for seven minutes to yield a self-supporting film. The resulting film was removed from the glass plate and was fixed in a metal frame. It was washed with running water for 10 minutes and then subjected to heat treatment at 280° C. for one minute to yield an aromatic polymer film. The Young's modulus and moisture absorption of the resulting film were measured, which are shown in Table 1.

EXAMPLE 7

A portion of the polymer solution of Example 6 was taken on a glass plate and then a uniform film was formed therefrom with a bar coater. This is immersed in a bath composed of 50% by weight of diethanolamine and 50% by weight of NMP for five minutes to yield a self-supporting film. The resulting film was washed with running water for 10 minutes and then subjected to heat treatment at 300° C. for five minutes to yield an aromatic polymer film. The Young's modulus of the resulting film was measured, which is shown in Table 1.

EXAMPLE 8

A 200-ml, four-necked flask equipped with a stirrer was charged with 13.43 g of 2,6-naphthalene dicarbohydrazide, 188.78 ml of N-methyl-2-pyrrolidone and 9 g of lithium bromide, followed by stirring under nitrogen under ice cooling. During a period from 10 to 30 minutes later, 13.06 g of 2-chloro-1,4-phthaloyl dichloride was added in five portions. After stirring for additional one hour, hydrogen chloride produced during the reaction was neutralized with 3.92 g of lithium carbonate to yield a transparent polymer solution. Even after being left to stand for two weeks, the polymer solution was transparent and maintained its fluidity.

A portion of the resulting polymer solution was taken on a glass plate and then a uniform film was formed therefrom with a bar coater. The film was heated at 120° C. for seven minutes to yield a self-supporting film. The resulting film was removed from the glass plate and was fixed in a metal frame. It was washed with running water for 10 minutes and then subjected to heat treatment at 280° C. for one minute to yield an aromatic polymer film.

EXAMPLE 9

A portion of the polymer solution of Example 8 was taken on a glass plate and then a uniform film was formed therefrom with a bar coater. This is immersed in a bath composed of 50% by weight of diethanolamine and 50% by weight of NMP for five minutes to yield a self-supporting film. The resulting film was washed with running water for 10 minutes and then subjected to heat treatment at 300° C. for five minutes to yield an aromatic polymer film.

EXAMPLE 10

A 200-ml, four-necked flask equipped with a stirrer was charged with 6.11 g of 2,6-naphthalene dicarbohydrazide, 8.71 g of 9,9-bis(4-aminophenyl)fluorene, 179 ml of N-methyl-2-pyrrolidone and 9 g of lithium bromide, followed by stirring under nitrogen under ice cooling. During a period from 10 to 30 minutes later, 10.16 g of terephthaloyl dichloride was added in five portions. After stirring for additional one hour, hydrogen chloride produced during the reaction was neutralized with 3.57 g of lithium carbonate to yield a transparent polymer solution. Even after being left to stand for two weeks, the polymer solution was transparent and maintained its fluidity.

A portion of the resulting polymer solution was taken on a glass plate and then a uniform film was formed therefrom with a bar coater. The film was heated at 120° C. for seven minutes to yield a self-supporting film. The resulting film was removed from the glass plate and was fixed in a metal frame. It was washed with running water for 10 minutes and then subjected to heat treatment at 280° C. for one minute to yield an aromatic polymer film.

EXAMPLE 11

The polymer film obtained in Example 5 was immersed in 1,2-dichloroethane containing 3% by weight of chlorosulfonic acid at 25° C. for 15 minutes and then removed. The film was washed with methanol to remove 1,2-dichloroethane and then was washed with water until the washings became neutral. Thus, a 72-µm thick polymer electrolyte membrane was produced. The resulting polymer electrolyte membrane had a resistance of 34Ω and an ionic conductance of 6.8 mS/cm.

EXAMPLE 12

The polymer film obtained in Example 7 was immersed in 1,2-dichloroethane containing 3% by weight of chlorosulfonic acid at 25° C. for 15 minutes and then removed. The film was washed with methanol to remove 1,2-dichloroethane and then was washed with water until the washings became neutral. Thus, a 41-µm thick polymer electrolyte membrane was produced. The resulting polymer electrolyte membrane had a resistance of 5Ω and an ionic conductance of 6.8 mS/cm.

COMPARATIVE EXAMPLE 1

A 200-ml, four-necked flask equipped with a stirrer was charged with 12.0 g of paraphenylene terephthalamide, 6.0 g of lithium bromide and 108 ml of N-methyl-2-pyrrolidone, followed by stirring under nitrogen at 60° C. The paraphenylene terephthalamide did not dissolve even after a lapse of 48 hours and, therefore, it was impossible to form a film.

COMPARATIVE EXAMPLE 2

A 200-ml, four-necked flask equipped with a stirrer was charged with 1.622 g of 1,4-phenylenediamine, 3.0036 g of 4,4'-diaminodiphenyl ether and 70.3 ml of N-methyl-2-pyrrolidone, followed by stirring under nitrogen under ice cooling. During a period from 10 to 30 minutes later, 6.091 g of terephthaloyl dichloride was added in five portions. After stirring for additional one hour, hydrogen chloride produced during the reaction was neutralized with 2.139 g of lithium carbonate to yield a transparent polymer solution. After being left to stand for 12 hours, the polymer solution was gelated to fall into a state where it could not be formed into film.

COMPARATIVE EXAMPLE 3

A 200-ml, four-necked flask equipped with a stirrer was charged with 4.9664 g of 4,4'-diaminodiphenylsulfone and 63.14 ml of N-methyl-2-pyrrolidone, followed by stirring under nitrogen under ice cooling. During a period from 10 to 30 minutes later, 4.0604 g of terephthaloyl dichloride was added in five portions. After stirring for additional one hour, hydrogen chloride produced during the reaction was neutralized with 1.426 g of lithium carbonate to yield a transparent polymer solution.

A portion of the resulting polymer solution was taken on a glass plate and then a uniform film was formed therefrom with a bar coater. The film was heated at 120° C. for seven minutes to yield a self-supporting film. The resulting film was removed from the glass plate and was fixed in a metal frame. It was washed with running water for 10 minutes and then subjected to heat treatment at 280° C. for one minute to yield an aromatic polymer film. The Young's modulus and moisture absorption of the resulting film were measured, which are shown in Table 1.

TABLE 1

| | l + m + n | l | m | n | Dehydration-cyclization | Solubility of source polymer | Young's modulus (GPa) | Elongation at break (%) | Moisture absorption rate (%) | Coefficient of moisture expansion (ppm/% Rh) |
|---|---|---|---|---|---|---|---|---|---|---|
| Example 1 | 100 | 0 | 50 | 50 | No | o | 7.7 | 29.9 | 3.5 | 35 |
| Example 2 | 100 | 0 | 70 | 30 | No | o | 5.6 | 17.9 | 3.5 | |
| Example 3 | 100 | 40 | 20 | 40 | No | o | 8.9 | 33.5 | 6.7 | |
| Example 4 | 100 | 0 | 50 | 50 | No | o | 5.4 | 42.5 | 5.6 | |
| Example 5 | 100 | 0 | 50 | 50 | Yes | o | 7.7 | 9.1 | 5.9 | |
| Example 6 | 100 | 0 | 30 | 70 | No | o | 9.8 | 11.7 | 5.2 | |
| Example 7 | 100 | 0 | 30 | 70 | Yes | o | 14.8 | 1.7 | 8.0 | |
| Example 8 | 100 | 0 | 0 | 100 | No | o | | | | |
| Example 9 | 100 | 0 | 0 | 100 | Yes | o | | | | |
| Example 10 | 100 | 0 | 50 | 50 | No | o | | | | |
| Comparative Example 1 | 100 | 100 | 0 | 0 | No | x | Impossible to form a film | Impossible to form a film | Impossible to form a film | |
| Comparative Example 2 | 100 | 50 | 50 | 0 | No | x | Impossible to form a film | Impossible to form a film | Impossible to form a film | |
| Comparative Example 3 | 100 | 100 | 0 | 0 | No | o | 3.6 | 50 | 6.8 | 189 |

INDUSTRIAL APPLICABILITY

According to the present invention, obtained were an aromatic carbohydrazide and a resulting aromatic polymer from dehydration-cyclization of such an aromatic carbohydrazide, which are soluble in an aprotic polar solvent and which exhibit a high Young's modulus, a great elongation at break and a low moisture absorption when being formed into a film. The aromatic polymer of the present invention is conformable to a current trend that halogen-containing polymers are not preferred because it has excellent characteristics even though it contains no halogen atoms.

Films containing the aromatic polymer of the present invention are used suitably for various applications such as magnetic recording medium, flexible printed circuit substrates, semiconductor-mounting substrates, multilayer circuit substrates, capacitors, printer ribbons, sound diaphragms, base films of solar batteries and electrolyte membranes. Use of the film as a magnetic recording medium is particularly preferable because the effects of the present invention will be fully shown.

Film containing the aromatic polymer of the present invention can be used as an acid-base type hydrocarbon polymer electrolyte membrane when being doped with an acid to form an aromatic polymer/acid composite. In addition, films containing the aromatic polymer of the present invention can be used as an electrolyte membrane when the aromatic polymer is modified with a polar group. The electrolyte membrane of the present invention is particularly useful as an electrolyte membrane for fuel cells.

In addition, according to the method of the present invention, a carbohydrazide structure was caused to react successfully under mild conditions at low cost.

The invention claimed is:

1. An aromatic polymer comprising structural units represented by chemical formulas (I), (II) and (III) and satisfying formulas (1) to (3) when molar fractions (%) of the structural units of the chemical formulas (I), (II) and (III) are represented by l, m and n, respectively:

$$80 \leq l+m+n \leq 100 \quad (1)$$

$$5 \leq m \leq 90 \quad (2)$$

$$20 \leq n \leq 90 \quad (3);$$

(I)

R$^1$: an aromatic group, and
R$^2$: a para-directed phenylene group, provided that each of the hydrogen atoms at 2-, 3-, 5- and 6-positions of an aromatic ring may be substituted with another atom or substituent;

(II)

R$^3$: a 1,3-bis(4-phenoxy)benzene group represented by chemical formula (IV):

(IV), and

R$^4$: a para-directed phenylene group, provided that each of the hydrogen atoms at 2-, 3-, 5- and 6-positions of an aromatic ring may be substituted with another atom or substituent;

(III)

R$^5$: 2, 6-naphthalene group, and
R$^6$: a para-directed phenylene group, provided that each of the hydrogen atoms at 2-, 3-, 5- and 6-positions of an aromatic ring may be substituted with another atom or substituent.

2. The aromatic polymer according to claim 1, wherein R$^1$ is an aromatic group containing no substituent selected from the group consisting of an ether group (—O—), a methylene group (—CH$_2$—) and a sulfone group (—SO$_2$—).

3. The aromatic polymer according to claim 1, wherein R$^1$ is a group selected from the group consisting of a phenyl group, a biphenyl group, a terphenyl group, a naphthalene group, an anthracene group, a diaminobenzanilide residue and a 9,9-bis(4-aminophenyl)fluorene residue, provided that part or all of the hydrogen of an aromatic ring may be substituted with another or other atoms or substituents.

4. The aromatic polymer according to claim 1, wherein R$^1$ is an aromatic group containing no halogen atom.

5. A film comprising the aromatic polymer according to claim 1.

6. The film according to claim 5, wherein the film has a tensile modulus of elasticity of 5 GPa or more in at least one direction, a moisture absorption of 7% or less, and an elongation at break of 20% or more in at least one direction.

7. A magnetic recording material comprising the film according to claim 5.

8. An aromatic polymer wherein part or all of the carbohydrazide structures contained in the aromatic polymer have been cyclized by dehydration, wherein the aromatic polymer before cyclization is an aromatic polymer comprising structural units represented by chemical formulas (I), (II) and (III) and satisfying formulas (1) to (3) when molar fractions (%) of the structural units of the chemical formulas (I), (II) and (III) are represented by l, m and n, respectively:

$$80 \leq l+m+n \leq 100 \quad (1)$$

$$5 \leq m \leq 90 \quad (2)$$

$$20 \leq n \leq 90 \quad (3)$$

(I)

R$^1$: an aromatic group, and
R$^2$: a para-directed phenylene group, provided that each of the hydrogen atoms at 2-, 3-, 5- and 6-positions of an aromatic ring may be substituted with another atom or substituent;

(II)

R³: an aromatic group having 12 or more carbon atoms which has at least one substituent selected from the group consisting of an ether group (—O—), a methylene group (—CH₂—) and a sulfone group (—SO₂—), and R⁴: a para-directed phenylene group, provided that each of the hydrogen atoms at 2-, 3-, 5- and 6-positions of an aromatic ring may be substituted with another atom or substituent;

(III)

R⁵: 2, 6-naphthalene group, and

R⁶: a para-directed phenylene group, provided that each of the hydrogen atoms at 2-, 3-, 5- and 6-positions of an aromatic ring may be substituted with another atom or substituent.

9. An aromatic polymer wherein the aromatic polymer according to claim 8 has been modified with a polar group.

10. The aromatic polymer according to claim 9, wherein the polar group is a sulfonic acid and/or a phosphonic acid.

11. An electrolyte membrane comprising the aromatic polymer according to claim 9.

12. A fuel cell using the electrolyte membrane according to claim 11.

13. A film comprising the aromatic polymer according to claim 9.

14. An aromatic polymer/acid composite comprising the aromatic polymer according to claim 8 and an acid.

15. An electrolyte membrane comprising the aromatic polymer/acid composite according to claim 14.

16. A fuel cell using the electrolyte membrane according to claim 15.

17. A separator comprising the aromatic polymer according to claim 8.

18. A fuel cell using the separator according to claim 17.

19. A film comprising the aromatic polymer according to claim 8.

* * * * *